United States Statutory Invention Registration [19]

[11] Reg. Number: H743

Bismark [43] Published: Feb. 6, 1990

[54] LOW CURRENT VOLTAGE REFERENCE

[75] Inventor: Otto H. Bismark, Fords, N.J.

[73] Assignee: The United States of America as represented by the Secretary of the Army, Washington, D.C.

[21] Appl. No.: 406,929

[22] Filed: Sep. 13, 1989

[51] Int. Cl.[4] ..... G05F 3/16

[52] U.S. Cl. ..... 323/313; 307/296.1

[56] References Cited

U.S. PATENT DOCUMENTS 2,951,208 7/1953 Barton .

3,522,548 5/1968 Heuner et al. .

OTHER PUBLICATIONS

Vittoz et al, "A Low-Voltage CMOS Bandgap Reference", IEEE Journal of Solid-State Circuits, vol. SC-14, No. 3, Jun. 1979.

*Primary Examiner*—Thomas H. Tarcza

*Assistant Examiner*—Linda J. Wallace

*Attorney, Agent, or Firm*—Anthony T. Lane; Edward Goldberg; Michael Sachs

[57] ABSTRACT

A voltage reference circuit for use with a low-voltage detector or like circuit includes a voltage source, a proportional-to-absolute-temperature circuit connected to said voltage source. The proportional-to-absolute-temperature circuit has a positive temperature coefficient and produces a reference voltage that is substantially independent of the source voltage. A diode having a large negative temperature coefficient is connected in series with the proportional-to-absolute-temperature circuit. The negative temperature coefficient characteristics of the diode are chosen so as to completely offset the positive temperature coefficient of the proportional to absolute temperature circuit. As such the voltage reference has a value which is substantially independent of temperature and the voltage source. The proportional-to-absolute-temperature circuit and the diode combination draw only a small current from said voltage source. Also provided is a start-up circuit in the form of a capacitor transistor network for generating small currents in the voltage reference circuit during start-up when the source voltage is connected to the circuit.

12 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LOW CURRENT VOLTAGE REFERENCE

GOVERNMENTAL INTEREST

The invention described herein was made in the course of or under contract no. DAAA21-86-C-0030 with the Government and may be manufactured, used and licensed by or for the Government for governmental purposes without the payment to me of any royalties thereon.

BACKGROUND OF THE INVENTION

1. Field of the Invention

The present invention relates to a voltage reference circuit. More particularly, the invention pertains to a low-current voltage reference circuit having a low temperature coefficient.

2. Description of the Prior Art

The use of low-voltage detectors in battery-operated electronic circuits to monitor a battery voltage is a common practice. Although most prior art devices have served the purpose, they have not proved entirely satisfactory under all conditions of service for the reason that some devices draw considerable power from the battery being monitored while others display significant voltage variations over normal changes in temperature. As such, those concerned with the development of low-voltage detectors have long recognized the need for a reliable voltage reference that draws minimum amounts of power and has a low temperature coefficient. The present invention fulfills this need.

SUMMARY OF THE INVENTION

The general purpose of this invention is to provide a voltage reference circuit which embraces all of the advantages of similarly employed devices and possesses none of the aforedescribed disadvantages. To attain this, the present invention contemplates a unique combination of a low-current voltage source that is proportional to absolute temperature and a P-N diode circuit that has a large negative temperature coefficient whereby voltage reference instabilities over wide temperature ranges are avoided.

An object of the present invention is the provision of a reliable voltage reference circuit.

Another object is to provide a voltage reference circuit having low power requirements.

A further object of the invention is the provision of a voltage reference circuit that is stable over large changes in temperature.

Other objects and many of the attendant advantages of this invention will be readily appreciated as the same becomes better understood by reference to the following detailed description when considered in connection with the accompanying drawings in which like reference numerals designate like parts throughout the figures thereof.

DETAILED DESCRIPTION OF THE PREFERRED EMBODIMENTS

Figure 1:
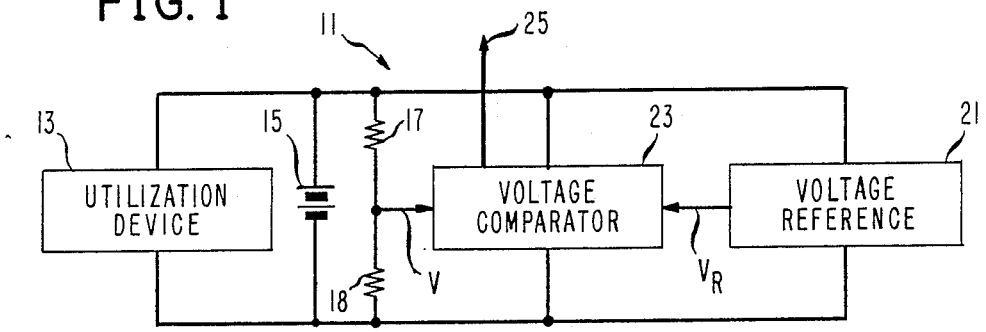
FIG. 1 shows a block diagram of the preferred embodiment connected to a battery-operated apparatus.

Referring now to the drawings there is shown in FIG. 1 a battery-operated system 11 having a utilization device 13 drawing DC operating power from a battery 15. A voltage divider, made up of resistors 17 and 18, and a voltage reference circuit 21 are also connected across battery 15. The output voltage $V_R$ of voltage reference circuit 21 is connected to a voltage comparator 23 which monitors the voltage of battery 15 by comparing the voltage V at the node between resistors 17 and 18 to the reference voltage $V_R$. Comparator 23 will produce a low-voltage warning signal at 25 when the voltage V has reached some predetermined low value. The output 25 may be used to energize a beeper, a light or other suitable warning device. It is noted that the voltage V will be equal to some fraction of the voltage of battery 15, as determined by the ratio of the resistances of resistors 17 and 18, and will vary linearly therewith. The voltage $V_R$, however, will be relatively constant over the expected voltage range of battery 15 during its useful life.

Figure 2:
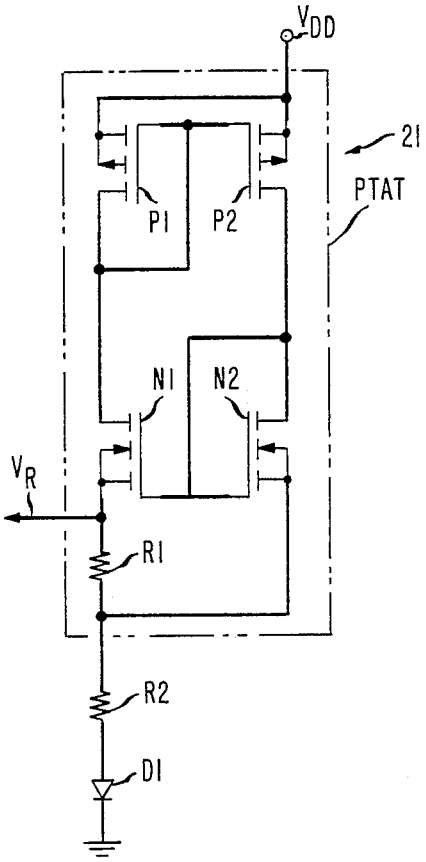
FIG. 2 is a circuit diagram of the preferred embodiment.

Voltage reference circuit 21 is shown in detail in FIG. 2. Circuit 21 includes a conventional proportional-to-absolute-temperature circuit (PTAT) having p-channel transistors P1 and P2, n-channel transistors N1 and N2, a drain supply voltage $V_{DD}$, and a reference voltage output $V_R$. An extensive quantitative description of the PTAT circuit may be found in Vittoz et al, "A LOW-VOLTAGE CMOS BANDGAP REFERENCE", IEEE Journal of Solid-State Circuits, Vol. SC-14, No. 3, June 1969, incorporated herein by reference.

The output $V_R$ is taken across the resistors R1 and R2, the P-N diode D1, and ground, which in this case is the source supply voltage $V_{SS}$ for the PTAT circuit. The diode D1 has a large negative temperature coefficient. The current levels in transistors P1, N1, P2, N2 must be very low to ensure operation in the sub-threshold region, where the drain current drops off exponentially with the gate-to-source voltage. If transistors P1 and P2 are fabricated of identical size and shape, their drain currents will be approximately equal. If transistor N1 is made larger than transistor N2 by a factor of K, the following relationships will hold:

$$J_2 = KJ_1,$$

$$V_{GS1} = C \ln J_1,$$

$$V_{GS2} = C \ln J_2,$$

where C is some constant of proportionality and $J_1$ and $J_2$ are current densities. Since the gates of transistors N1 and N2 are tied together, the voltage difference due to current densities $J_1$ and $J_2$ will appear across resistor R1 as follows:

$$V_{GS2} - V_{GS1} = C \ln(J_2/J_1).$$

The constant C is proportional to threshold voltage which is equal to kT/q, where T is the absolute temperature, k is Boltzman's constant and q is the electronic charge. As long as the current mirror ensures a reasonably constant current density ratio $J_2/J_1$, voltage $V_R$ will be proportional to absolute temperature T, and hence have a positive temperature coefficient. The resistance ratio R2/R1 is chosen to amplify the voltage difference $V_{GS2} - V_{GS1}$ to the extent necessary to compensate for the negative temperature coefficient of the diode D1. As such, the designer may choose a slightly positive or a slightly negative temperature coefficient for the voltage reference circuit 21 by choosing different resistance ratios R2/R1. A simulation of the voltage reference circuit 21 with $V_{DD}$ ranging from 8 volts to 4 volts showed that a small positive or small negative temperature coefficient is readily achievable, depending on the choice of transistors P1, P2, N1, N2 and resistor ratio R2/R1.

Figure 3:
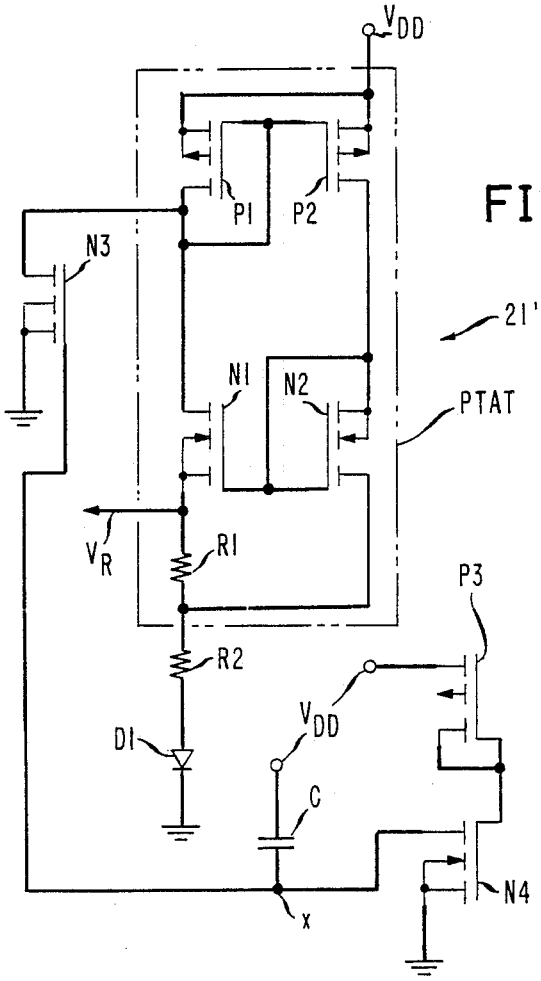
FIG. 3 is a circuit diagram of a modified embodiment of the device shown in FIG. 2.

The reference voltage $V_R$ may have a stable no-current state, in which case the reference voltage $V_R$ drops to zero, preventing the comparator 23 from working properly. To compensate for such a possible irregularity, the circuit of FIG. 2 may have start-up devices connected thereto as shown in FIG. 3. In addition to the circuit elements shown in FIG. 2, the voltage reference circuit 21' of FIG. 3 includes high impedance n-channel transistors N3 and N4, and a p-channel transistor P3. Transistor N3 is connected to the node between transistors P1 and N1. A capacitor C is connected from the voltage $V_{R\,DD}$ to a node between transistors N3 and N4. When the circuit 21' is turned on by applying $V_{DD}$, the capacitor C will pull up node x, thereby turning on transistor N3. This current will be sufficient to start up the circuit 21' by ensuring that current is conducted through transistor N1. After $V_{DD}$ has reached the sum of an n-threshold and a p-threshold, as established by transistors P3 and N4, transistor N4 will turn on, discharging the capacitor C to ground, which will turn transistor N3 off causing the start-up current to stop flowing through transistor N1.

Obviously many modifications and variations of the present invention are possible in the light of the above teachings. It is therefore to be understood, that within the scope of the appended claims, the invention may be practiced otherwise than as specifically described.

The foregoing disclosure and drawings are merely illustrative of the principles of this invention and are not to be interpreted in a limiting sense. It is to be understood that the invention should not be limited to the exact details of construction shown and described because obvious modifications will occur to a person skilled in the art.

What is claimed is:

1. A voltage reference circuit comprising:

a voltage source;

a first circuit connected to the voltage source having a positive temperature coefficient, and including means for generating a reference voltage that is substantially independent of the voltage source over a predetermined voltage range; and a negative temperature coefficient device connected in series with the first circuit.

2. The circuit of claim 1 wherein said negative temperature coefficient device is a diode connected in series with said first circuit.

3. The circuit of claim 2 wherein said first circuit includes a proportional-to-absolute-temperature device.

4. The circuit of claim 2 wherein said means for generating a reference voltage includes means that produces a voltage proportional to absolute temperature.

5. The circuit of claim 4 further including start-up means for generating a small start-up current in said first circuit as said voltage source is being connected to said first circuit.

6. The circuit of claim 5 wherein said start-up means includes a capacitor connected to said voltage source and a transistor circuit connected to said first circuit whereby said start-up current is generated through said transistor circuit as said voltage source is applied to said capacitor.

7. A low-voltage detector circuit comprising:

a voltage source;

a voltage comparator;

means connected between said voltage source and said voltage comparator to provide a voltage directly proportional to the voltage of said voltage source;

a voltage reference circuit connected to said voltage comparator and to said voltage source, said voltage reference circuit including a first circuit having a positive temperature coefficient and including means for generating a reference voltage that is substantially independent of the voltage source over a predetermined range; and a negative temperature coefficient device connected in series with the first circuit.

8. The detector of claim 7 wherein said negative temperature coefficient device is a diode.

9. The detector of claim 8 wherein said first circuit includes a proportional-to-absolute-temperature device.

10. The detector of claim 8 wherein said means for generating a reference voltage includes means that produces a voltage proportional to absolute temperature.

11. The detector of claim 10 further including start-up means for generating a small start-up current is said first circuit as said voltage source is connected to said first circuit.

12. The detector of claim 11 wherein said start-up means includes a capacitor connected to said voltage source and a transistor circuit connected to said first circuit whereby said start-up current is generated through said transistor circuit as said voltage source is applied to said capacitor.

* * * * *